United States Patent
Arimilli et al.

(10) Patent No.: US 6,467,030 B1
(45) Date of Patent: Oct. 15, 2002

(54) METHOD AND APPARATUS FOR FORWARDING DATA IN A HIERARCHIAL CACHE MEMORY ARCHITECTURE

(75) Inventors: Ravi Kumar Arimilli; Lakshminarayana Baba Arimilli; James Stephen Fields, Jr.; Sanjeev Ghai; Praveen S. Reddy, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/435,962

(22) Filed: Nov. 9, 1999

(51) Int. Cl.[7] .............................................. G06F 12/00
(52) U.S. Cl. ........................ 711/137; 711/122; 712/207
(58) Field of Search ................................. 711/122, 117, 711/118, 119, 123, 137; 710/29; 712/205, 207

(56) References Cited

U.S. PATENT DOCUMENTS 5,860,096 A * 1/1999 Undy et al. .................. 711/122
6,085,291 A * 7/2000 Hicks et al. ................. 711/137
6,138,209 A * 10/2000 Krolak et al. ............... 711/128
6,199,154 B1 * 3/2001 Witt ............................ 712/205

* cited by examiner

Primary Examiner—Do Hyun Yoo
Assistant Examiner—Kimberly McLean
(74) Attorney, Agent, or Firm—Casimer K. Salys; Bracewell & Patterson, L.L.P.

(57) ABSTRACT

A method and apparatus for forwarding data in a hierarchial cache memory architecture is disclosed. A cache memory hierarchy includes multiple levels of cache memories, each level having a different size and speed. A command is initially issued from a processor to the cache memory hierarchy. If the command is a Demand Load command, data corresponding to the Demand Load command is immediately forwarded from a cache having the data to the processor. Otherwise, if the command is a Prefetch Load command, data corresponding to the Prefetch Load command is held in a cache reload buffer within a cache memory preceding the processor.

8 Claims, 4 Drawing Sheets

METHOD AND APPARATUS FOR FORWARDING DATA IN A HIERARCHIAL CACHE MEMORY ARCHITECTURE

CROSS-REFERENCE TO A RELATED PATENT APPLICATION

The present invention is related to the subject matter of an allowed United States Patent Application entitled "METHOD AND APPARATUS FOR TRANSMITTING CONTROL SIGNALS WITHIN A HIERARCHIAL CACHE MEMORY ARCHITECTURE FOR A DATA PROCESSING SYSTEM," filed on even date, Ser. No. 09/437,040 and is incorporated herein by reference.

BACKGROUND OF THE INVENTION

1. Technical Field

The present invention relates to data processing systems in general and, in particular, to data processing systems having a hierarchial cache memory architecture. Still more particularly, the present invention relates to a method and apparatus for forwarding data in a hierarchial cache memory architecture.

2. Description of the Prior Art

A data processing system typically includes a processor coupled to a variety of storage devices arranged in a hierarchial manner. Hardware and/or software can dynamically allocate parts of the storage devices within the hierarchy for addresses deemed most likely to be accessed soon. The type of storage employed in each hierarchical level relative to the processor is normally determined by balancing the requirements for speed, capacity, and cost.

In addition to a main memory, a commonly employed storage device in the hierarchy includes a high-speed memory known as a cache memory. A cache memory speeds the apparent access times of the relatively slower main memory by retaining the instructions and/or data that the processor will most likely access again soon, and making the instructions and/or data available to the processor at a much lower latency. As such, cache memory enables relatively fast access to a subset of instructions and/or data that were recently transferred from the main memory to the processor, and thus improves the overall speed of the data processing system.

A multi-level cache memory hierarchy is a cache memory system consisting of several levels of cache memories, each level having a different size and speed. Typically, the first level cache memory, commonly known as the level one (L1) cache, has the fastest access time and the highest cost per bit as compared with the other levels of cache memories. The remaining levels of cache memories, such as level two (L2) caches, level three (L3) caches, etc., have a relatively slower access time but also a relatively lower cost per bit. Typically, each higher cache memory level has a progressively slower access time and a lower per-bit cost. The present disclosure provides a method and apparatus for forwarding data within a hierarchial cache memory architecture.

SUMMARY OF THE INVENTION

In accordance with a preferred embodiment of the present invention, a cache memory hierarchy includes multiple levels of cache memories, each level having a different size and speed. A command is initially issued from a processor to the cache memory hierarchy. If the command is a Demand Load command, data corresponding to the Demand Load command is immediately forwarded from a cache having the data to the processor. Otherwise, if the command is a Prefetch Load command, data corresponding to the Prefetch Load command is held in a cache reload buffer within a cache memory preceding the processor.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
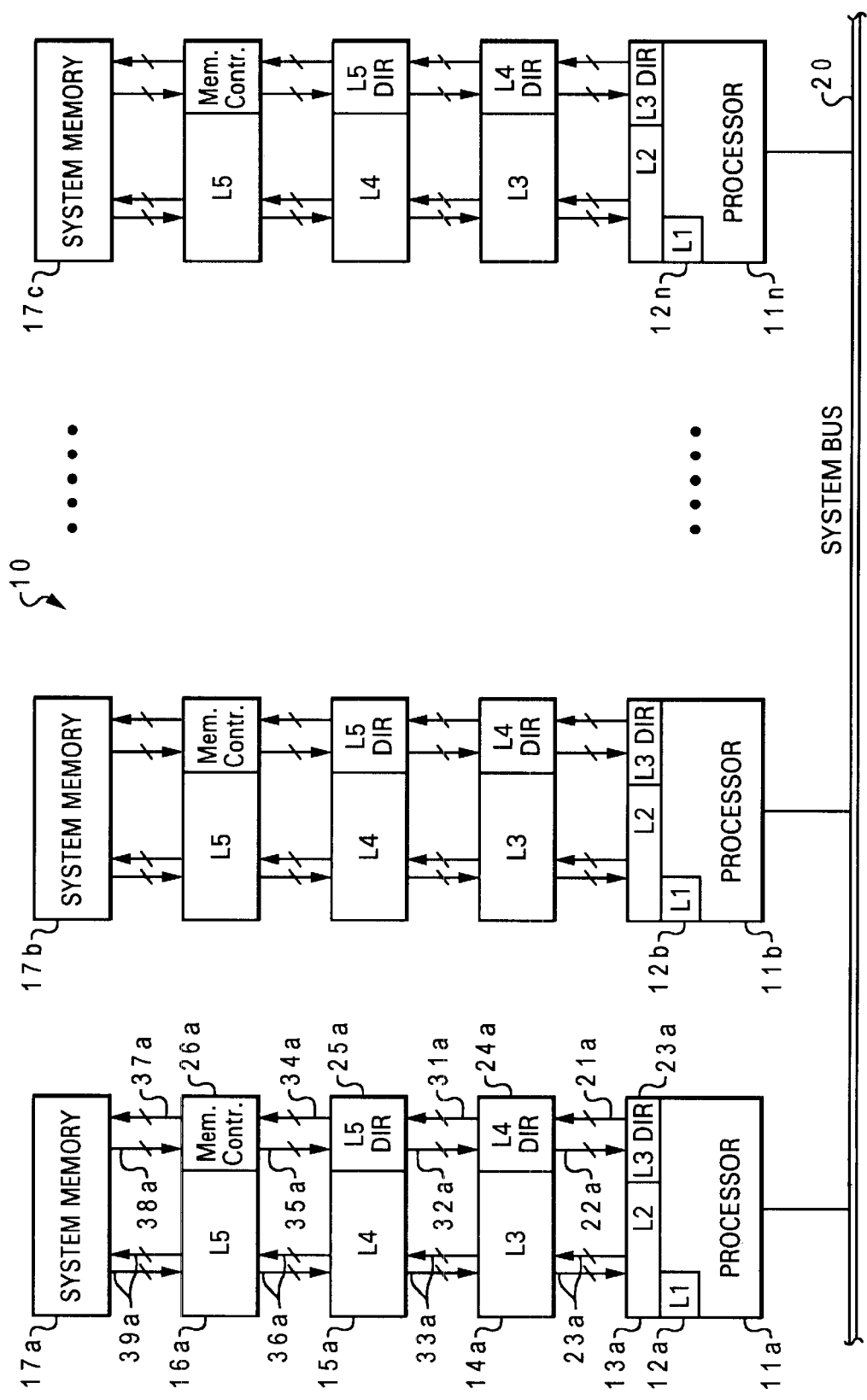
FIG. 1 is a block diagram of a data processing system in which a preferred embodiment of the present invention is incorporated.

The present invention may be implemented in any data processing system having multiple levels of cache memories organized in a hierarchical manner. Referring now to the drawings and in particular to FIG. 1, there is depicted a block diagram of a data processing system in which a preferred embodiment of the present invention is incorporated. As shown, a data processing system 10 includes central processing units (CPUs) 11a–11n. CPUs 11a–11n are interconnected to each other through a system interconnect 20. System interconnect 20 may be implemented as a bus or a switch.

In addition, each of CPUs 11a–11n has an associated multi-level cache memory hierarchy. In this implementation, each of CPUs 11a–11n has five levels of cache memories. Preferably, level one (L1) caches and level two (L2) caches are contained with a CPU. For example, CPU 11a contains an L1 cache 12a and an L2 cache 13a; and CPU 11b contains an L1 cache 12b and an L2 cache 13b. The remaining levels of cache memories are stacked on each other to form a cache memory hierarchy. For example, a level three (L3) cache 14a is coupled to a level four (L4) cache 15a; L4 cache 15a is coupled to a level five (L5) cache 16a; and L5 cache 16a is coupled to a system memory 17a. System memories 17a–17n are preferably shared by all of CPUs 11a–11n. An L1 cache is located at the top of each cache memory hierarchy.

Each level of cache memory contains a cache directory and a cache controller for the next upper level cache memory. For example, L2 cache 13a includes an L3 cache directory and controller 23a; L3 cache 14a includes an L4 cache directory and controller 24a; and L4 cache 15a includes an L5 cache directory and controller 25a. Similarly, L5 cache 16a includes a system memory controller 26a for controlling system memory 17a.

Data is transmitted between each cache level of the cache memory hierarchy via two data buses. For example, data travel between L2 cache 13a and L3 cache 14a via data buses 23a. Data travel between L3 cache 14a and L4 cache 15a via data buses 33a. Data travel between L4 cache 15a and L5 cache 16a via data buses 36a. Similarly, data travel between L5 cache 16a and system memory 17a via data buses 39a. Each data bus is preferably 144 bits wide.

The communication between levels of the cache memory hierarchy is controlled via a control bus and a response bus. For example, L3 cache directory and controller 23a communicates with L4 cache directory and controller 24a via control bus 21a and response bus 22a. L4 cache directory and controller 24a communicates with L5 cache directory and controller 25a via control bus 31a and response bus 32a. L5 cache directory and controller 25a communicates with system memory controller 26a via control bus 34a and response bus 35a. Similarly, system memory controller 26a communicates with system memory 17a via control bus 37a and response bus 38a. A control command may be sent from a processor to various levels of caches via a corresponding control bus.

Figure 2:
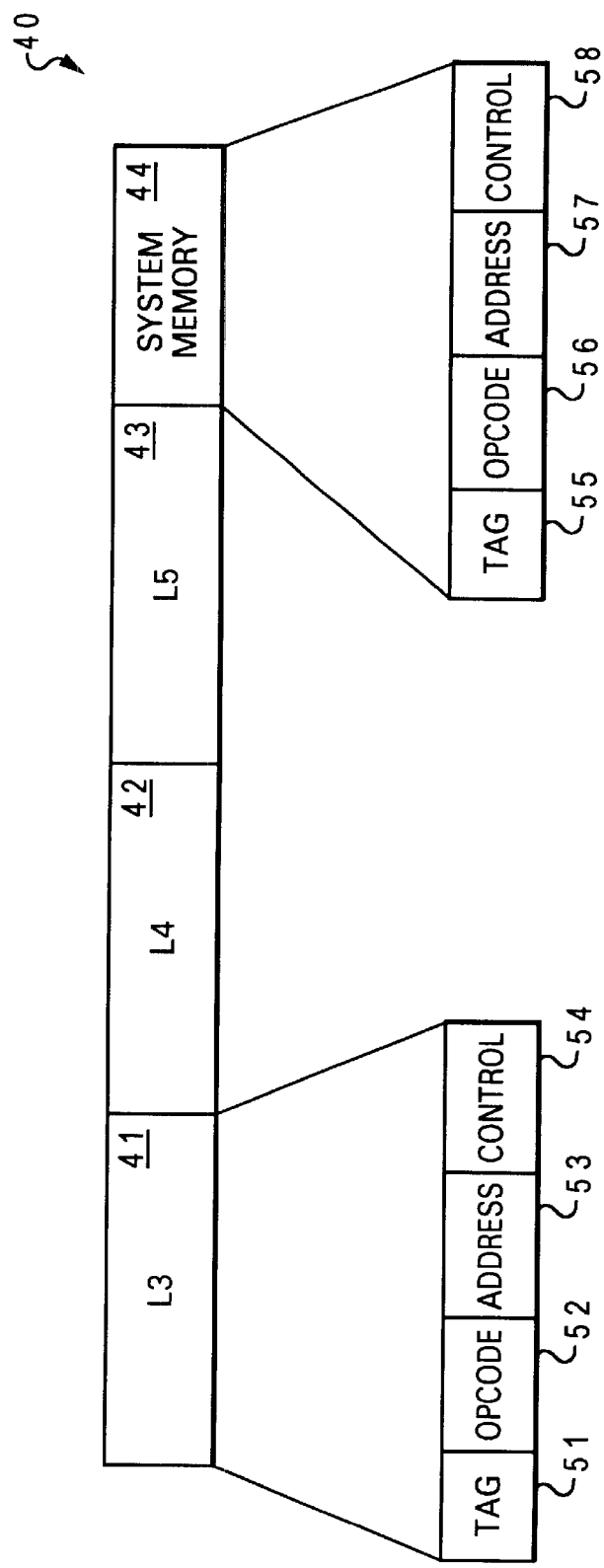
FIG. 2 is a block diagram of a control command, in accordance with a preferred embodiment of the present invention.

With reference now to FIG. 2, there is illustrated a block diagram of a control command in accordance with a preferred embodiment of the present invention. As shown, a control command 40, which can be utilized within the control buses of the cache memory hierarchy from FIG. 1, includes four control blocks, namely an L3 control block 41, an L4 control block 42, an L5 control block 43, and a system memory control block 44. As the control block names imply, each of control blocks 41–43 corresponds to a cache memory level, and system memory control block 44 corresponds to a shared system memory.

In this implementation, for example, L3 control block 41 corresponds to L3 cache 14a, L4 control block 42 corresponds to L4 cache 15a, L5 control block 43 corresponds to L5 cache 16a, and system memory control block 44 corresponds to system memory 17a. Each of control blocks 41–44 contains multiple fields. For example, L3 control block 41 contains a tag field 51, an opcode field 52, a cache address field 53, and a control bit field 54. Each of fields 51–54 is used to check whether or not there is a cache "hit" and control the normal operation of a cache memory, as those fields are known to those skilled in the relevant art. Each of control blocks 42 and 43 preferably contains a tag field, an opcode field, a cache address field, and a control bit field identical to those in control block 41. Similarly, control block 44 contains a tag field 55, an opcode field 56, an address field 57, and a control bit field 58. Each of fields 55–58 is used to control the normal operation and obtain data from a system memory, as those fields are known to those skilled in the relevant art.

The length of each of fields 51–58 depends on a specific cache memory hierarchy. In this example, tag field 51 is eight bits wide, opcode field 52 is six bits wide, address field 53 is 18 bits wide, and control field 54 is nine bits wide. As control command 40 travels "upstream" through control buses 21a, 31a, 34a, and 37a, some of control blocks 41–44 can be removed. For example, if there is a cache "miss" in L3 cache 14a, L3 control block 41 is removed from control command 40 before control command 40 is sent to control bus 31a. Similarly, if there is a cache "miss" in L4 cache 15a, L4 control block 42 is removed from control command 40 before control command 40 is sent to control bus 34a. Thus, the width of control bus 34a is preferably narrower than that of control bus 31a, and the width of control bus 37a is preferably narrower than that of control bus 34a.

Figure 3:
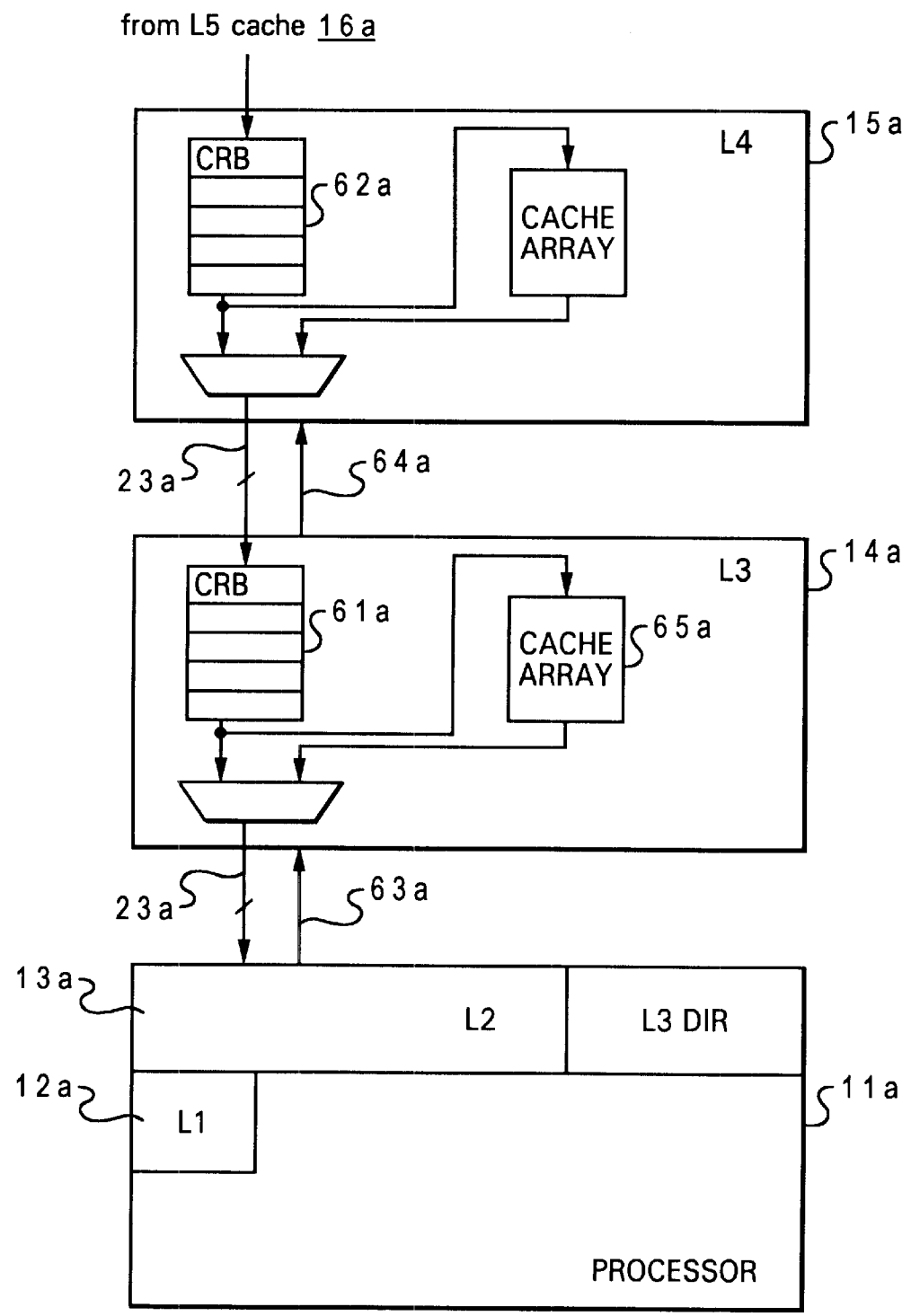
FIG. 3 is a block diagram of a cache reload buffer within a cache memory of a cache memory hierarchy, in accordance with a preferred embodiment of the present invention.

Referring now to FIG. 3, there is illustrated a block diagram of a cache reload buffer within a cache memory of a cache memory hierarchy, in accordance with a preferred embodiment of the present invention. As shown, L3 cache 14a contains a cache reload buffer 61a, and L4 cache 15a includes a cache reload buffer 62a. Cache reload buffer 61a is several entries deep, and can hold data from L4 cache 15a. Similarly, cache reload buffer 62a is several entries deep, and can hold data from a next higher level cache, such as L5 cache 16a from FIG. 1. L4 cache 15a can send data to cache reload buffer 61a of L3 cache 14a, in response to a Prefetch Load command or a Demand Load command from processor 11a.

As a preferred embodiment of the present invention, data accessed in response to a Demand Load command from a requesting processor will be forwarded immediately from a "hit" cache to the requesting processor. The data accessed may or may not be written into any cache(s) between the "hit" cache and the requesting processor. Otherwise, data accessed in response to a Prefetch Load command from the requesting processor will be held in a cache reload buffer of a cache memory preceding the requesting processor. The data accessed can be held in a cache reload buffer of any cache memory preceding the requesting processor up to the cache memory immediately preceding the requesting processor. Similarly, the data accessed may or may not be written into any cache(s) between the "hit" cache and the cache memory preceding the requesting processor.

In FIG. 3, for example, data accessed in response to a Demand Load command from processor 11a is forwarded immediately from L4 cache 15a (assuming a cache "hit" in L4 cache 15a) to processor 11a. The data accessed may or may not be written to a cache array 65a of L3 cache 14a, a cache array of L2 cache, and a cache array of L1 cache. Otherwise, data accessed in response to a Prefetch Load command from processor 11a is transferred from L4 cache 15a (again assuming a cache "hit" in L4 cache 15a) to a cache reload buffer 61a of L3 cache 14a, and a subsequent Demand Load command for the same data will cause the delivery of this prefetch data to processor 11a. The data accessed in response to the Prefetch Load command may also be held in a cache reload buffer (not shown) of L2 cache 13a or a cache reload buffer (not shown) of L1 cache 12a.

In a preferred embodiment, the size of cache reload buffers 61a and 62a are programmably adjustable. To accommodate such adjustment, a throttle control line 64a is utilized to control data flow from cache reload buffer 62a to L3 cache 14a, and a throttle control line 63a is utilized to control data flow from cache reload buffer 61a to processor 11a. The assertion of a throttle control line indicates the cache reload buffer of an associated cache is full and is not ready to accept additional data. For example, the assertion of throttle control line 64a indicates that cache reload buffer 61a of L3 cache 14a is full and is not ready to accept additional data.

Figure 4:
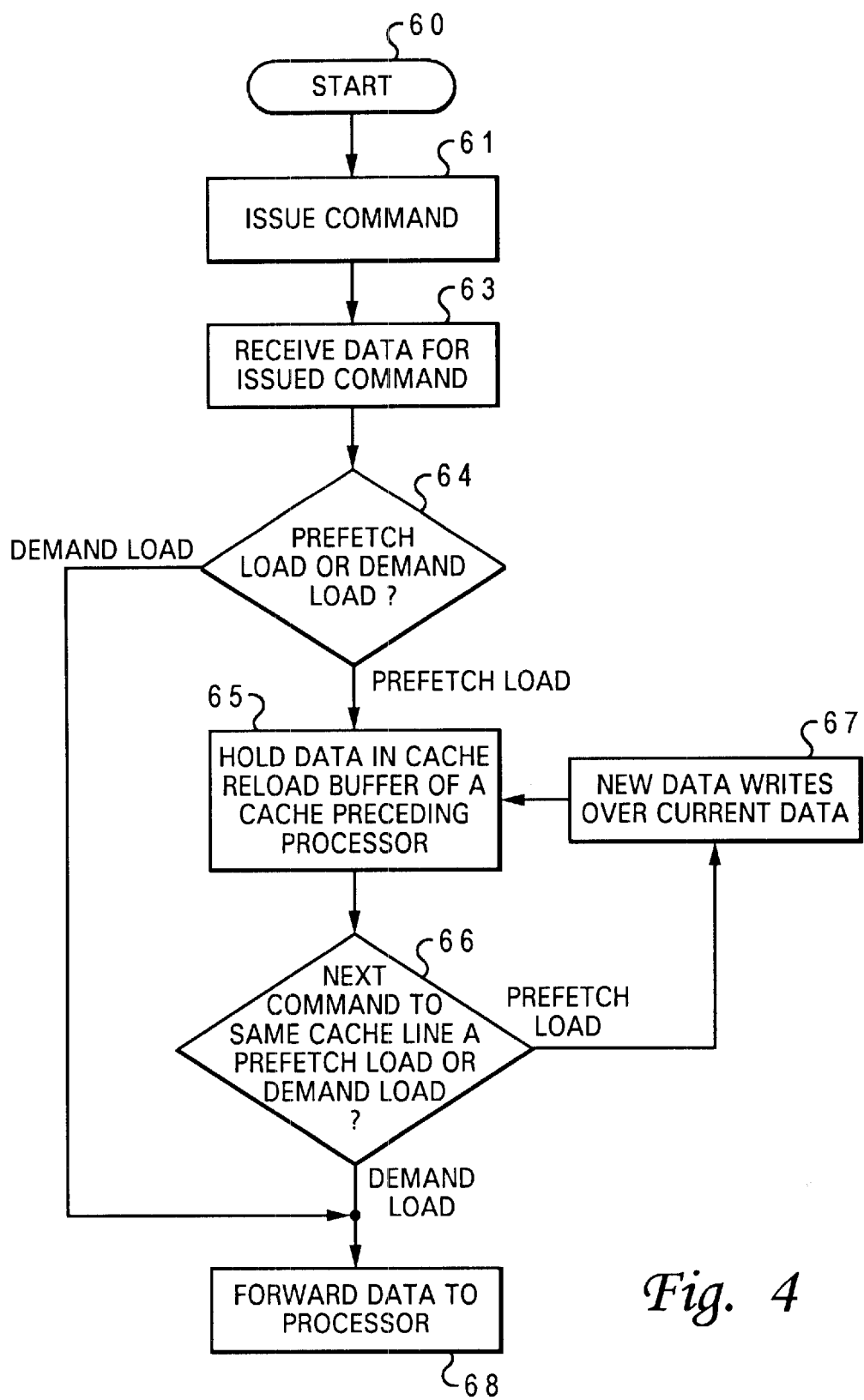
FIG. 4 is a high-level logic flow diagram of a method for forwarding data in a cache memory hierarchy, in accordance with a preferred embodiment of the present invention.

With reference now to FIG. 4, there is illustrated a high-level logic flow diagram of a method for forwarding data in a hierarchial cache memory architecture, in accordance with a preferred embodiment of the present invention. Starting at block 60, a Prefetch Load or a Demand Load command is issued by a requesting processor to a current level cache (e.g. L3 cache 14a from FIG. 3), as shown in block 61. The data for the command is received from a next lower level cache (e.g. L4 cache 15a from FIG. 4) to the cache reload buffer of a current level cache, as depicted in block 63. This is because the cache directory and controller for the next lower level cache is resided within the current level cache, as mentioned previously.

A determination is made whether the command is a Prefetch Load or a Demand Load, as illustrated in block 64.

If the command is a Prefetch Load, the data are held in a cache reload buffer of a cache preceding the requesting processor (for this example, cache reload buffer 61a from FIG. 3), as shown in block 65. Another determination is made whether a subsequent command to the same cache line is a Prefetch Load or a Demand Load, as depicted in block 66. If the subsequent command to the same cache line is a Prefetch Load, the data in the cache reload buffer of the cache preceding the requesting processor are written over by the new data from the subsequent command, as illustrated in block 67, and the process returns to block 65.

Otherwise, if the command is a Demand Load, either from block 64 or block 66, the data are forwarded to the requesting processor, as shown in block 68.

As has been described, the present invention provides a method and apparatus for forwarding data in a hierarchial cache memory architecture of a data processing system. Although a five-level cache memory hierarchy is used to described the present invention, it should be understood that the present invention can be practiced within a variety of system configurations.

While the above techniques apply to cache memories, and specifically to a hierarchical cache memory structure in a data processing system, they are adaptable and contemplated to be useful in conjunction with other memory structures and other storage devices within a data processing system.

While the invention has been particularly shown and described with reference to a preferred embodiment, it will be understood by those skilled in the art that various changes in form and detail may be made therein without departing from the spirit and scope of the invention.

What is claimed is:

1. A method of forwarding data in a hierarchial cache memory architecture for a data processing system, said method comprising the steps of:

issuing a command from a processor to a first and a second level of cache memories, wherein said first level of cache memories is in a higher hierarchial order than said second level of cache memories;

in response to said command being a Demand Load command, immediately forwarding data corresponding to said Demand Load command from said second level of cache memories having said data corresponding to said Demand Load command to said processor; and in response to said command being a Prefetch Load command, forwarding data from said second level of cache memories having said data corresponding to said Prefetch Load command to a cache reload buffer within said first level of cache memories, wherein said first level of cache memories is immediately preceding said processor in said hierarchial cache memory architecture.

2. The method according to claim 1, wherein said immediately forwarding data step further includes a step of immediately forwarding data corresponding to said Demand Load command from said second level of cache memories having said data corresponding to said Demand Load command to all levels of cache memories between said processor and said second level of cache memories having said data corresponding to said Demand Load command.

3. The method according to claim 1, wherein said method further includes the steps of:

issuing a second command from said processor said first and second level of cache memories; and in response to said second command being a Demand Load command, immediately forwarding data corresponding to said Demand Load command from said cache reload buffer within said first level of cache memories to said processor.

4. The method according to claim 1, wherein a directory and cache controller of said second level of cache memories having said data corresponding to said Demand Load command is located within a next higher hierarchial level of cache memories from said cache having said data corresponding to said Demand Load command.

5. A hierarchial cache memory architecture for a data processing system, comprising:

a processor for issuing a command to a first and a second level of cache memories, wherein said first level of cache memories is in a higher hierarchial order than said second level of cache memories;

means for immediately forwarding data corresponding to said Demand Load command from said second level of cache memories having said data corresponding to said Demand Load command to said processor, in response to said command being a Demand Load command; and means for forwarding data from said second level of cache memories having said data corresponding to said Prefetch Load command to a cache reload buffer within said first level of cache memories, wherein said first level of cache memories is immediately preceding said processor in said hierarchial cache memory architecture.

6. The hierarchial cache memory architecture according to claim 5, wherein said means for immediately forwarding data corresponding to said Demand Load command from said second level of cache memories having said data corresponding to said Demand Load command to all levels of cache memories between said processor and said second level of cache memories having said data corresponding to said Demand Load command.

7. The hierarchial cache memory architecture according to claim 5, wherein said hierarchial cache memory architecture further includes:

means for issuing a second command from said processor to said first and second levels of cache memories; and means for immediately forwarding data corresponding to said Demand Load command from said cache reload buffer within said first level of cache memories to said processor, in response to said second command being a Demand Load command.

8. The hierarchial cache memory architecture according to claim 5, wherein a directory and cache controller of said second level of cache memories having said data corresponding to said Demand Load command is located within a next higher hierarchial level of cache memories from said cache having said data corresponding to said Demand Load command.

* * * * *